July 1, 1924.  1,499,617

A. T. KASLEY

REDUCTION GEARING

Filed May 10, 1921

A. T. Kasley
INVENTOR

BY David C. Davis
ATTORNEY

Patented July 1, 1924.                                                    1,499,617

UNITED STATES PATENT OFFICE.

ALEXANDER T. KASLEY, OF ESSINGTON, PENNSYLVANIA, ASSIGNOR TO WESTING-HOUSE GEAR AND DYNAMOMETER COMPANY, A CORPORATION OF PENNSYLVANIA.

REDUCTION GEARING.

Application filed May 10, 1921. Serial No. 468,439.

*To all whom it may concern:*

Be it known that I, ALEXANDER T. KASLEY, a citizen of the United States, and a resident of Essington, in the county of Delaware and State of Pennsylvania, have invented a new and useful Improvement in Reduction Gearing, of which the following is a specification.

My invention relates to reduction gearing, particularly intended for reducing the speed of marine turbines, and has for its object to provide apparatus of the character designated which shall possess requisite strength, may be made cheaply, and which shall occupy a small amount of floor space.

Reduction gearing is quite commonly used in the marine field for the purpose of reducing the speed of a turbine to a suitable propeller shaft speed. On account of the high speeds and powers transmitted and the deflections resulting therefrom, the floating frame type of reduction gear which permits of movement of the pinion member in a plane at right angles to the plane of the gear and pinion axes was devised. Ordinarily, pinion and gear members have been mounted in bearings arranged at the ends thereof. I have found that the bearings for the gear members may be mounted between the tooth portions thereof, thereby constituting what might be termed an overhung construction. This construction results in the possibility of making a lighter floating frame and, consequently, a frame which has a smaller inertia factor. In this way I am enabled to make the gear case somewhat shorter and relatively wider than heretofore and to provide strong gear supports, considering the mass thereof, thereby rendering it possible to make a better and cheaper gear set, and, at the same time, to effect a saving in floor space.

Figure 1:
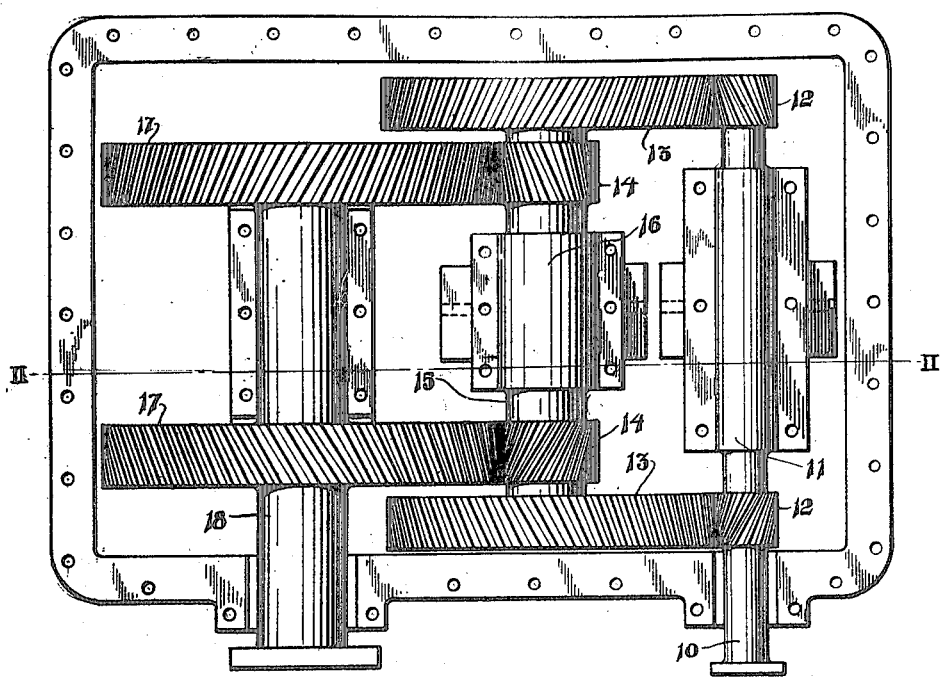
Figure 2:
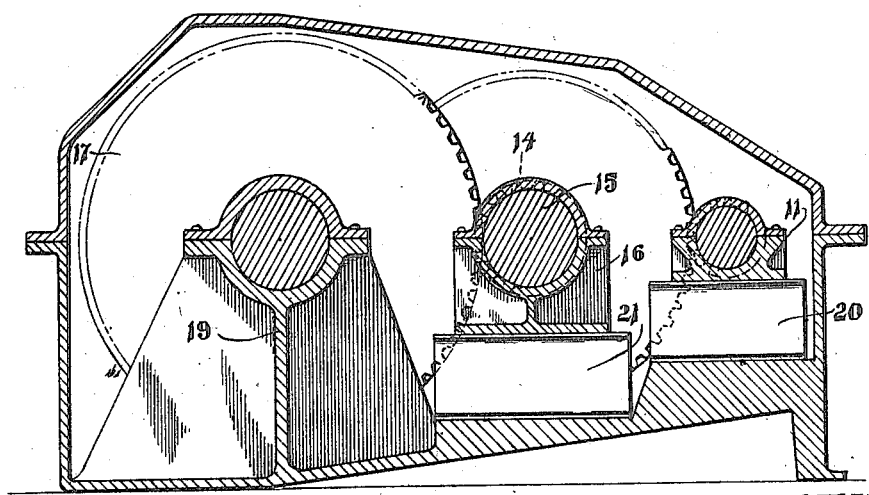

Apparatus embodying features of my invention is illustrated in the accompanying drawings, forming a part of this application, in which, Figure 1 is a plan view of an arrangement of gearing embodying features of my invention; and Figure 2 is a sectional view taken along the line II—II of Figure 1.

Referring now more particularly to the drawings for a detailed description of my invention, a driving shaft 10, provided with pinion members 12, is journaled in a bearing support member 11, the shaft 10 being driven by any suitable means, for example, a marine turbine. The pinion portions 12 of the driving pinion member mesh with the gear portions 13. The gear portions 13 and the pinion portions 14 of the intermediate gear member are carried by the intermediate shaft 15, the latter being journaled in the bearing support member 16 arranged between the pinion and gear portions. The driven gear member comprises two gear portions 17 which mesh with the pinion portions 14 and are carried by the shaft 18, the latter being journaled in the bearing support member 19 arranged between the gear portions.

The bearing support members 11 and 16 for the driving and intermediate gear members are preferably supported by flexible supporting means, for example, I-beam support members 20 and 21.

The operation of my mechanism is as follows: Power, at high speed, is applied to the driving shaft 10 and the speed is reduced by the double reduction gearing shown in order to drive the shaft 19 at a suitable speed for driving, for example, a ship propeller shaft. The bearing support members 11 and 16 being carried by flexible supporting means, such members may deflect sufficiently to obtain a balance of tooth pressures, should there be deflection of the gear members or for any other reason should the load tend to be borne unequally by the teeth of the gear members.

From the foregoing, it will be seen that I have devised an arrangement of gearing in which the frames for supporting the pinion and intermediate gear members may be made shorter and lighter than those heretofore constructed and known to me, and, at the same time, it is possible to devise a relatively stronger reduction gear and one which occupies a relatively small amount of floor space.

While I have shown my invention in but one form, it will be obvious to those skilled in the art that it is not so limited but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a reduction gear, the combination of meshing pinion and gear members, each having a plurality of toothed portions, supporting means for the pinion and gear members arranged between the toothed portions so that the latter overhang the supporting means, said means furnishing the entire support of the respective pinion and gear members, and flexible means for supporting the pinion supporting means.

2. A double reduction gear comprising driving, intermediate, and driven gear members, each having a plurality of toothed portions, a supporting member for each of the gear members arranged between the toothed portions, said member furnishing the entire support for the respective gear members, and flexible supporting means for the bearing member of the driving gear member.

3. A double reduction gear comprising driving, intermediate, and driven gear members, each having a plurality of toothed portions, a supporting bearing member for each of the gear members arranged between the toothed portions, said members furnishing the entire support of the respective gear members, and flexible supporting means for the bearing members of the driving and intermediate gear members.

In testimony whereof, I have hereunto subscribed my name this 28th day of April, 1921.

ALEXANDER T. KASLEY.